United States Patent
Abe et al.

(10) Patent No.: US 9,118,087 B2
(45) Date of Patent: Aug. 25, 2015

(54) ELECTRODE FOR LITHIUM SECONDARY BATTERY

(75) Inventors: Toshio Abe, Tokai (JP); Takefumi Okumura, Hitachinaka (JP)

(73) Assignee: HITACHI, LTD., Tokyo (JP)

( * ) Notice: Subject to any disclaimer, the term of this patent is extended or adjusted under 35 U.S.C. 154(b) by 1211 days.

(21) Appl. No.: 13/004,918

(22) Filed: Jan. 12, 2011

(65) Prior Publication Data

US 2011/0171525 A1 Jul. 14, 2011

(30) Foreign Application Priority Data

Jan. 12, 2010 (JP) ................................ 2010-003553

(51) Int. Cl.

| | | |
|---|---|---|
| H01M 4/02 | (2006.01) | |
| H01M 4/04 | (2006.01) | |
| H01M 4/62 | (2006.01) | |
| H01M 4/64 | (2006.01) | |
| H01M 10/0525 | (2010.01) | |
| H01M 4/66 | (2006.01) | |
| H01M 4/525 | (2010.01) | |
| H01M 4/587 | (2010.01) | |

(52) U.S. Cl.
CPC .......... *H01M 10/0525* (2013.01); *H01M 4/623* (2013.01); *H01M 4/624* (2013.01); *H01M 4/661* (2013.01); *H01M 4/525* (2013.01); *H01M 4/587* (2013.01); *Y02E 60/122* (2013.01); *Y02T 10/7011* (2013.01)

(58) Field of Classification Search
USPC ............... 429/208, 209–246; 29/623.1–623.5
See application file for complete search history.

(56) References Cited

U.S. PATENT DOCUMENTS

| 6,440,605 B1 * | 8/2002 | Kise et al. ....................... 429/217 |
| 2006/0159997 A1 | 7/2006 | Sunagawa et al. |
| 2007/0287289 A1 | 12/2007 | Haba et al. |
| 2008/0292965 A1 * | 11/2008 | Kubota et al. ................. 429/246 |

FOREIGN PATENT DOCUMENTS

| JP | 08-329928 | 12/1996 |
| JP | 2005-332797 | 12/2005 |
| JP | 2006-185854 | 7/2006 |
| JP | 2007-253318 | 10/2007 |
| JP | 2007-335470 | 12/2007 |
| JP | 2009-146752 | 7/2009 |

OTHER PUBLICATIONS

Machine Translation of Takashi et al. (JP 2009-146752, published Jul. 2009, pp. 1-18).*
JP Office Action of Appln. No. 2010-003553 dated May 8, 2012 with partial English translation.

* cited by examiner

*Primary Examiner* — Basia Ridley
*Assistant Examiner* — Caitlin Wilmot
(74) *Attorney, Agent, or Firm* — Baker Botts L.L.P.

(57) ABSTRACT

Disclosed are an electrode for a lithium secondary battery which includes a metal substrate and a plated layer arranged on the metal substrate and bearing active material particles and resin particles embedded therein, in which a part of the active material particles and the resin particles has a protruding portion beyond the plated layer; and a lithium secondary battery using the electrode. The electrode helps the lithium secondary battery to be resistant to deterioration and property degradation at high temperature and allows the battery to have high input-output performance and to be suitable typically for hybrid electric vehicles.

19 Claims, 3 Drawing Sheets

ELECTRODE FOR LITHIUM SECONDARY BATTERY

CLAIM OF PRIORITY

The present application claims priority from Japanese Patent application serial No. 2010-003553, filed on Jan. 12, 2010, the content of which is hereby incorporated by reference into this application.

BACKGROUND OF THE INVENTION

1. Field of the Invention

The present invention relates to a novel electrode for a lithium secondary battery which has high input-output performance and is advantageous for use typically in hybrid electric vehicles.

2. Description of Related Art

There have been recently made demands to reduce emission of carbon dioxide for protection of the environment and for prevention from global warming. Hybrid electric vehicles (HEVs) and electric vehicles (EVs) have been commercialized as devices for reducing carbon dioxide emission.

Secondary batteries which can undergo a number of charging/discharging cycles are essential devices as power sources for motor-driven vehicles.

Among them, lithium secondary batteries (lithium ion secondary batteries) receive attention as power sources (energy sources) for such motor-driven vehicles because of their high operating voltages and capability of generating a high output.

Lithium secondary batteries for use as power sources for HEVs and EVs require characteristic properties different from those of lithium secondary batteries for use typically in household appliances such as mobile phones and notebook computers.

Specifically, the lithium secondary batteries for HEVs require characteristic properties such as charging-discharging behavior at a high rate, operability at low temperatures of 0° C. or lower, and storage life and cycle life in an environment at high temperatures of higher than 50° C. Among them, battery life at high temperatures is important, because automobiles have product lifecycles longer than those of household appliances and are used in a high-temperature environment.

A carbon material such as graphite is mainly used as a negative-electrode active material for lithium secondary batteries. When this negative-electrode active material is used in a high-temperature environment, delamination between the negative-electrode active material and a copper current collector often occurs and worsens, because there is a difference in coefficient of linear expansion between the negative-electrode active material and the copper current collector and this causes a stress.

In addition, when the lithium secondary batteries are charged and discharged, positive and negative electrodes thereof intercalate and release lithium ions and thereby expand and contract.

The expansion and shrinkage of the electrodes can reduce adhesion between the positive-electrode active material and the current collector or between the negative-electrode active material and the current collector and can thereby cause delamination of the positive-electrode active material or the negative-electrode active material from the current collector.

Independently, the use of silicon (Si), tin (Sn) or another metal capable of forming an alloy with lithium and having a large theoretical capacity as a negative-electrode active material has been studied, for achieving larger capacities of lithium secondary batteries.

When the metal capable of forming an alloy with lithium is used in the negative-electrode active material, the resulting negative-electrode active material shows a volume change larger than that of the carbon material, and the delamination of the negative-electrode active material becomes a more significant problem.

Several possible solutions to these problems have been proposed as below.

Japanese Patent Laid-Open No. 2005-332797 (Patent Literature 1) proposes a technique of using an electrode for a lithium secondary battery, in which active material particles are arranged on a current collector, the active material particle being directly bonded to a surface of the current collector in a state where the bottom of the active material particle is imbedded in a concave portion formed on the surface of the current collector.

Japanese Patent Laid-Open No. 2009-146752 (Patent Literature 2) proposes a technique of using a current collector for a lithium ion secondary battery, in which adhesive resin particles are formed on a surface thereof, and a part of the resin particles is exposed from the surface.

SUMMARY OF THE INVENTION

An electrode for a lithium secondary battery comprises a current collector for a lithium secondary battery that is a metal substrate; and a plated layer arranged on a surface of the current collector, wherein active material particles capable of inserting and extracting lithium ions and resin particles adhesive with the active material particles are embedded in the plated layer, wherein a part of the active material particles and the resin particles has a protruding portion beyond the plated layer.

The present invention provides the electrode for the lithium secondary battery which helps the lithium secondary battery to be resistant to deterioration and property degradation at high temperature and allows the lithium secondary battery to exhibit high input-output performance and to be advantageously usable typically in the hybrid electric vehicles.

DETAILED DESCRIPTION OF PREFERRED EMBODIMENTS

Figure 1:
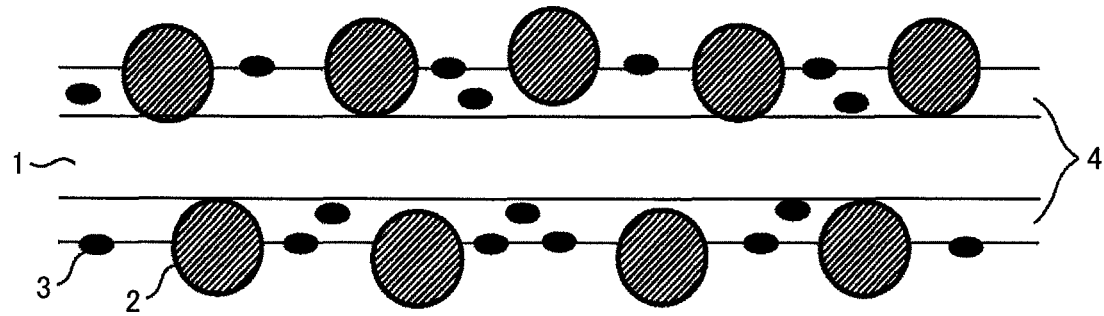
FIG. 1 is a sectional view illustrating an electrode for a lithium secondary battery according to an embodiment (Example 1) of the present invention.

According to the known technique disclosed in Patent Literature 1, the current collector has portions on its surface where the active material is not imbedded and adhesion to the active material in these portions can still remain poor.

According to the known technique disclosed in Patent Literature 2, the current collector is in contact with the active material through the interposition of the adhesive resin particles, and this can cause a higher internal resistance.

Under these circumstances, an object of the present invention is to provide an electrode for a lithium secondary battery, which helps the lithium secondary battery to be resistant to deterioration and property degradation at high temperatures and allows the lithium secondary battery to exhibit high input-output performance and to be advantageously usable typically in hybrid electric vehicles.

An electrode for a lithium secondary battery of an embodiment in the present invention includes a current collector for the lithium secondary battery that is a metal substrate; and a mixture layer being arranged on the surface of the current collector as a coating of an electrode material containing active material particles capable of inserting and extracting lithium ions, further including a plated layer arranged between the metal substrate and the mixture layer, the active material particles and resin particles being adhesive with the active material particles being embedded in the plated layer, and a part of the active material particles and the resin particles being arranged at an interface between the plated layer and the mixture layer.

That is to say, the part of the active material particles and the resin particles has a protruding portion beyond the plated layer.

It is preferable that the electrode comprises the mixture layer applied to the surface of the plated layer as the coating of the electrode material containing the active material particles.

The electrode preferably further includes a conductive material embedded in the plated layer.

The plated layer preferably includes a first plated layer being adjacent to the current collector and bearing the active material particles as embedded therein; and a second plated layer being arranged between the first plated layer and the mixture layer and bearing the resin particles as embedded therein. A part of the active material particles and the resin particles is arranged at an interface between the second plated layer and the mixture layer.

That is to say, the part of the active material particles and the resin particles has the protruding portion beyond the second plated layer.

The electrode preferably further includes a conductive material embedded in the second plated layer.

The first plated layer preferably has a thickness larger than that of the second plated layer.

The electrode for the lithium secondary battery can be used as at least one of a positive electrode and a negative-electrode in the lithium secondary battery which includes the positive electrode capable of inserting and extracting lithium ions; the negative electrode capable of inserting and extracting lithium ions; a separator arranged between the positive electrode and the negative electrode; and an electrolyte solution.

The electrode for the lithium secondary battery is preferably produced by subjecting the metal substrate to dispersion plating with an aqueous suspension containing the active material particles and the resin particles.

The electrode for the lithium secondary battery is also preferably produced by subjecting the metal substrate to dispersion plating with an aqueous dispersion containing the active material particles, the resin particles, and the conductive material.

The electrode for the lithium secondary battery (hereinafter also briefly referred to as "electrode") according to an embodiment has a main feature in that both particles of an active material and particles of a resin (an adhesive resin (a binder)) being adhesive with the active material particles are embedded in a surface of a current collector, so as to improve adhesion between the current collector and an electrode mixture layer (mixture layer), in which the current collector is composed of a metal substrate and for use in a lithium secondary battery, and the mixture layer is a coating made from an electrode material containing the active material particles capable of inserting and extracting lithium ions.

This technique provides the electrode for the lithium secondary battery which shows high adhesion between the mixture layer and the current collector while keeping its resistance low.

The electrode for the lithium secondary battery and the lithium secondary battery according to embodiments, and fabrication methods of them will be illustrated below with reference to the attached drawings.

[Structure of Electrode for Lithium Secondary Battery]

FIG. 1 depicts a schematic sectional view showing apart of an electrode for a lithium secondary battery according to an embodiment according to the present invention.

The electrode has a structure including a metal substrate 1; and, immobilized on its surface through a plated layer 4, active material particles 2 and a binder 3.

The electrode for the lithium secondary battery may further form a mixture layer typically containing the active material particles 2 and the binder 3 on the metal substrate 1 on which the active material particles 2 and the binder 3 have been immobilized as necessary.

Figure 2:
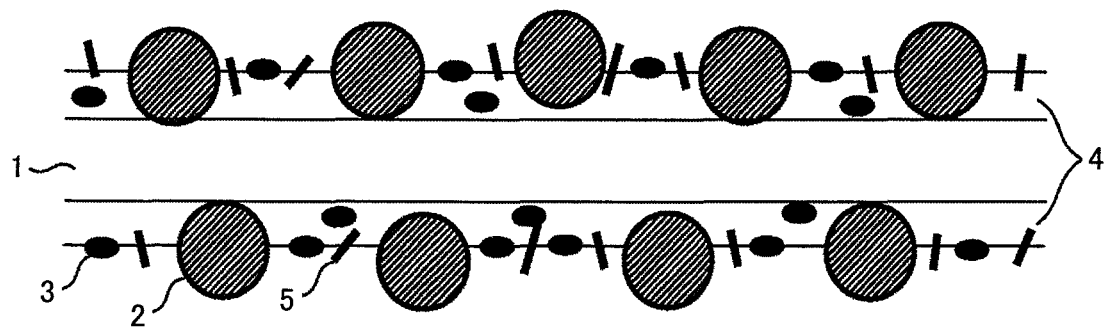
FIG. 2 is a sectional view illustrating an electrode for a lithium secondary battery according to another embodiment (Example 2) of the present invention.

FIG. 2 depicts a schematic sectional view showing a part of an electrode for a lithium secondary battery as another embodiment.

This electrode has a structure including a metal substrate 1, and immobilized on its surface through a plated layer 4, active material particles 2, a binder 3, and a conductive material 5.

The electrode for the lithium secondary battery may further form a mixture layer typically containing the active material particles 2 and the binder 3 on the metal substrate 1 on which the active material particles 2, the binder 3 and the conductive material 5 have been immobilized as necessary.

This electrode can have a further lower resistance, because the conductive material 5 contained in the plated layer 4 increases electrical contact with the active material particles 2.

Figure 3:
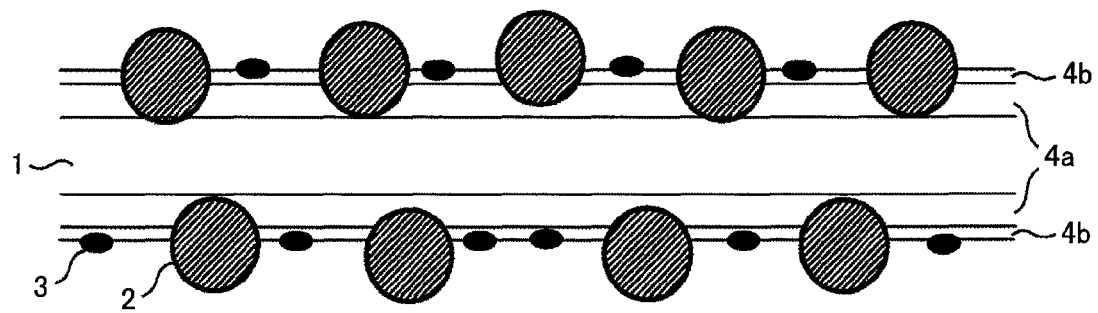
FIG. 3 is a sectional view illustrating an electrode for a lithium secondary battery according to yet another embodiment (Example 3) of the present invention.

FIG. 3 depicts a schematic sectional view showing a part of an electrode for a lithium secondary battery as still another embodiment.

This electrode has a structure including a metal substrate 1; and respectively immobilized thereto, active material particles 2 as embedded in a first plated layer 4*a*, and a binder 3 as embedded in a second plated layer 4*b*.

The electrode for the lithium secondary battery may further form a mixture layer typically containing the active material particles 2 and the binder 3 on the metal substrate 1 on which the active material particles 2 and the binder 3 have been immobilized as necessary.

The electrode includes the plated layer 4 having a two-layer structure of the first plated layer 4*a* and the second plated layer 4*b*, in which the second plated layer 4*b* has a thickness smaller than that of the first plated layer 4*a*, and the electrode is protected from increase in resistance thereof, which increase is caused by the binder 3 in the second plated layer 4*b*.

Figure 4:
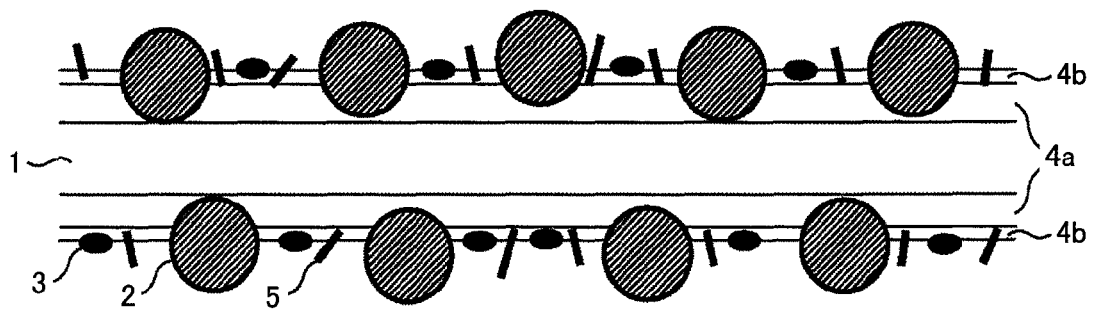
FIG. 4 is a sectional view illustrating an electrode for a lithium secondary battery according to still another embodiment (Example 4) of the present invention.

FIG. 4 depicts a schematic sectional view showing a part of an electrode for a lithium secondary battery as yet another embodiment.

This electrode has a structure including a metal substrate 1; active material particles 2 immobilized on the surface of the metal substrate 1 through a first plated layer 4a; and a binder 3 and a conductive material 5 both immobilized on the surface of the first plated layer 4a through a second plated layer 4b.

The electrode for the lithium secondary battery may further form a mixture layer typically containing the active material particles 2 and the binder 3 on the metal substrate 1 on which the active material particles 2 and the binder 3 have been immobilized as necessary.

The electrode can have a further lower resistance, because the conductive material 5 in the second plated layer 4b increases electrical contact with the active material particles 2.

These electrodes for the lithium secondary batteries can employ materials as mentioned below.

[Metal Substrate]

The metal substrate for the Fabrication of a positive-electrode current collector or negative-electrode current collector can be made of a metal generally used in current collectors for customary lithium secondary batteries.

Exemplary materials for the positive-electrode current collector include foils, punched metals, expanded metals and meshes each made of aluminum, stainless steel, nickel, titanium, or an alloy of them.

Exemplary materials for the negative-electrode current collector include foils, punched metals, expanded metals and meshes each made of copper, stainless steel, nickel, titanium, or an alloy of them.

The metal substrate has a thickness of preferably 8 to 20 μm. The metal substrate may show poor handleability if it is excessively thin. In contrast, the metal substrate may cause the battery to have a lower energy density per unit weight if it is excessively thick.

The surfaces of the metal substrate can be subjected to a physical treatment such as a roughening and/or a chemical treatment such as a molecular modification.

[Active Material Particles]

Exemplary positive-electrode active materials usable herein include lithium composite oxides.

The lithium composite oxides are preferably oxides represented by the compositional formula: $Li_\alpha Mn_x M1_y M2_z O_2$, wherein M1 represents at least one element selected from Co and Ni; and M2 represents at least one element selected from the group consisting of Co, Ni, Al, B, Fe, Mg and Cr, where $x+y+z=1$, $0<\alpha<1.2$, $0.2 \leq x \leq 0.6$, $0.2 \leq y \leq 0.4$ and $0.05 \leq z \leq 0.4$.

Among them, a lithium composite oxide represented by the compositional formula in which M1 is Ni or Co, and M2 is Co or Ni is preferred.

The lithium composite oxide for use herein is more preferably $LiMn_{1/3}Ni_{1/3}Co_{1/3}O_2$.

In the composition, a larger amount of Ni allows the electrode to have a larger capacity; a larger amount of Co allows the electrode to generate a higher output at low temperature; and a larger amount of Mn allows the electrode to be fabricated at a lower material cost.

The added elements help the electrode to have more stable cycle properties.

Exemplary positive-electrode active materials further include orthorhombic phosphate compounds represented by a general formula: $LiM_X PO_4$ (wherein M represents Fe or Mn, and $0.01 \leq X \leq 0.4$) or a general formula: $LiMn_{1-X} M_X PO_4$ (wherein M represents a bivalent cation other than Mn, and $0.01 \leq X \leq 0.4$), and having a symmetry of space group Pmnb.

Above all, $LiMn_{1/3}Ni_{1/3}CO_{1/3}O_2$ is suitable as the lithium battery material for the hybrid electric vehicles (HEVs) because of its satisfactory low-temperature behavior and cycle stability.

Exemplary negative-electrode active materials include carbonaceous materials; compounds capable of alloying with lithium; and lithium metal.

Exemplary carbonaceous materials include natural graphite; composite carbonaceous materials each including natural graphite and formed thereon a coating through chemical vapor deposition (CVD) as a dry process or spraying as a wet process; artificial graphites prepared by sintering of a resin material such as an epoxy resin or phenol resin, or of a pitch material derived from petroleum or coal; and amorphous carbon materials.

Exemplary compounds capable of alloying with lithium include Group 14 (carbon group) element metals such as silicon, germanium and tin; and oxides and nitrides thereof.

Among these materials, carbonaceous materials are excellent material because of their high electroconductivity, satisfactory low-temperature behavior and good cycle stability.

Of carbonaceous materials, those having a wide interlayer space between carbon network planes ($d_{002}$) are suitable for their rapid charging/discharging capability and excellent low-temperature behavior. It should be noted, however, that some carbonaceous materials having a wide $d_{002}$ value show insufficient capacity or charging/discharging efficiency during the initial stage of charging, and hence they preferably have a $d_{002}$ value of 0.39 nm or less. Such a material is also referred to as a pseudo-anisotropic carbon.

The electrode may be incorporated with a highly conductive carbonaceous material such as graphite-like material, amorphous material, or activated carbon.

Graphite-like materials useful for the present invention include those having one of the following properties (1) to (3):

(1) an R value (or $I_D/I_G$ ratio) is 0.2 to 0.4, wherein $I_D$ is intensity of the peak in a range from 1300 to 1400 $cm^{-1}$, and $I_G$ is intensity of the peak in a range from 1580 to 1620 $cm^{-1}$, both in a Raman spectral pattern;

(2) a half width Δ of the peak in a range from 1300 to 1400 $cm^{-1}$ in a Raman spectral pattern is 40 to 100 $cm^{-1}$; and (3) an X value (or $I_{(110)}/I_{(004)}$ ratio) is 0.1 to 0.45, wherein $I_{(110)}$ is peak intensity from the (110) plane and $I_{(004)}$ is peak intensity from the (004) plane, both in an X-ray diffraction pattern.

[Plated Layer]

The plated layer is generally made from a metal constituting the current collector.

Exemplary metals for a plated layer for use in the positive electrode include aluminum, stainless steel, nickel, titanium, and alloys of them.

Exemplary metals for a plated layer for use in the negative electrode include copper, stainless steel, nickel, titanium, and alloys of them.

[Binder]

Exemplary binders for use in the fabrication of the positive electrode and negative electrode include poly(vinylidene fluoride)s (PVDFs), polytetrafluoroethylenes (PTFEs), poly(acrylic acid)s, polyimide resins, and styrene-butadiene rubbers (SBRs).

[Conductive Material]

Exemplary conductive materials include graphite, acetylene black, carbon black, Ketjenblack, carbon nanotubes and derivatives thereof, carbon fibers, metal powders, and metal fibers.

[Production Method for Electrode for Lithium Secondary Battery]

A method for fabricating the electrode for a lithium secondary battery according to an embodiment will be illustrated in detail below, in which the electrode is a negative electrode and is fabricated by plating a copper foil with a plating material containing an active material particles and a binder.

Initially, an electrolytic copper foil or rolled copper foil is prepared as the metal substrate.

The copper foil for use herein can have any desired thickness, surface roughness, and shape according to necessity without limitation.

Especially when certain thermal stability is required, the copper foil is preferably a rolled copper foil made from a copper alloy typically with tin, silver or zirconium.

The copper foil is then subjected to a surface treatment. Hereinafter the treatment conditions are described as conditions for one side of the copper foil, unless otherwise specified. The both sides of the copper foil can be subjected to the surface treatment simultaneously by passing the copper foil through between two electrodes arranged as facing each other in a plating bath. When the both sides are to be treated, the treatment conditions for one side are adopted to each side.

When the prepared copper foil is a rolled copper foil, it is subjected to an electrolytic degreasing to remove oils deposited on the surface. This cleaning process is performed by subjecting the copper foil to cathodic (electrolytic) degreasing with a solution of a base such as sodium hydroxide.

Next, the copper foil is subjected to acid pickling to neutralize residual base and to remove copper oxide film both remaining on the surface of the copper foil. The acid pickling is performed by immersing in an acidic aqueous solution typically of sulfuric acid. The liquid for use in the acid pickling can also be a copper etchant.

Next, the copper foil is subjected to a copper-plated layer formation process by performing electrolysis (electrolytic plating) using the copper foil as a cathode in an acidic copper-plating bath containing copper sulfate and sulfuric acid as main components, to thereby form a copper-plated layer.

The composition and temperature of the bath containing copper sulfate and sulfuric acid, and the electrolytic plating conditions for the formation of the copper-plated layer can be chosen within wide ranges not specifically limited, but preferably chosen within the following range.

Copper sulfate pentahydrate: 20 to 300 $g/dm^3$
Sulfuric acid: 10 to 200 $g/dm^3$
Active material: 0 to 100 $g/dm^3$
Binder: 0 to 10 $g/dm^3$
Conductive material: 0 to 2 $g/dm^3$
Dispersant: 0.001 to 10 $g/dm^3$
Bath temperature: 15° C. to 50° C.
Plating current density: 0.5 to 30 $A/dm^2$
Plating time: 1 to 20 seconds The dispersant is used for uniformly dispersing the particles such as the active material particles and binder particles in the plating bath (plating solution), and examples thereof include proteins such as gelatin, collagen peptides, and glue; polycarboxylic acids such as polyacrylic acids and salts of them; and cationic or nonionic surfactants.

The plating bath may further contain additives for leveling the surface.

Exemplary additives include mercapto-containing compounds such as 3-mercapto-1-sulfonic acid and bis(3-sulfopropyl)disulfide; surfactants such as polyethylene glycol and polypropylene glycol; and chloride ions. Such additives can be used in combination.

Independently, various additives for copper plating used typically in the fabrication of printed circuit boards can be used herein.

Exemplary additives for copper plating usable herein include Top Lucina LS supplied by Okuno Chemical Industries Co., Ltd., Copper Gream CLX supplied by Meltex Inc., CU-BRITE TH-R III supplied by EBARA-UDYLITE CO., LTD, and THRU-CUP EUC supplied by Uemura & Co., Ltd.

The plating current density is preferably determined according to the surface shape to be formed.

For smoothing the surface in portions other than particles such as the active material particles, the plating current density is preferably lower than the limiting current density. In contrast, for roughening the surface in portions other than particles such as the active material particles, the plating current density is preferably equal to or higher than the limiting current density.

The plating current density is preferably set high within such a range as to immobilize the particles to the surface, because the productivity increases with an increasing plating current density.

The plating is preferably performed while applying ultrasonic vibration to the plating bath in order to prevent reaggregation of particles which have been once dispersed in the plating bath.

The ultrasonic vibration preferably has a frequency of about 15 kHz to 100 kHz.

The electrolytic plating bath can also be a nickel-plating bath such as Watts bath or sulfamate bath, instead of the copper sulfate plating bath.

When two or more plated layers are to be formed, a second copper-plated layer is subsequently formed.

The second copper-plated layer is also formed by performing electrolytic plating using the copper foil as a cathode in an acidic copper plating bath containing copper sulfate and sulfuric acid as main components.

The composition and temperature of the bath containing copper sulfate and sulfuric acid, and the electrolytic plating conditions for the formation of the second copper-plated layer can be chosen within wide ranges not specifically limited and can be those in the above-mentioned copper plating process.

When dispersion plating is performed while suspending two or more types of particles having different properties in a plating bath to electrochemically codeposit the particles, the particles are deposited indifferent amounts in the resulting plated layer, in which the difference is based on the differences in specific gravity, electroconductivity, and particle size between them.

For this reason, the formation of two or more plated layers facilitates the control of deposited amounts of the respective particles.

In the fabrication method of the electrode for a lithium secondary battery according to the embodiment, the work after the formation of a final plated layer is further subjected to downstream processing to obtain desired properties.

Initially, a nickel plated layer or nickel alloy plated layer is formed for preventing oxidation of copper, and subsequently a zinc plated layer or zinc alloy plated layer is formed for improving the thermal stability.

Subsequently, the work is subjected to trivalent chromium conversion coating using a reactive chromate solution containing trivalent chromium.

Next, a silane coupling layer is formed as a chemical conversion coating for improving adhesion with the binder.

[Structure of Lithium Secondary Battery]

The lithium secondary battery can be in any form such as cylindrical, laminate, coin, or card form without limitation. The structure of a spirally wound lithium secondary battery will be illustrated below as an example.

Figure 5:
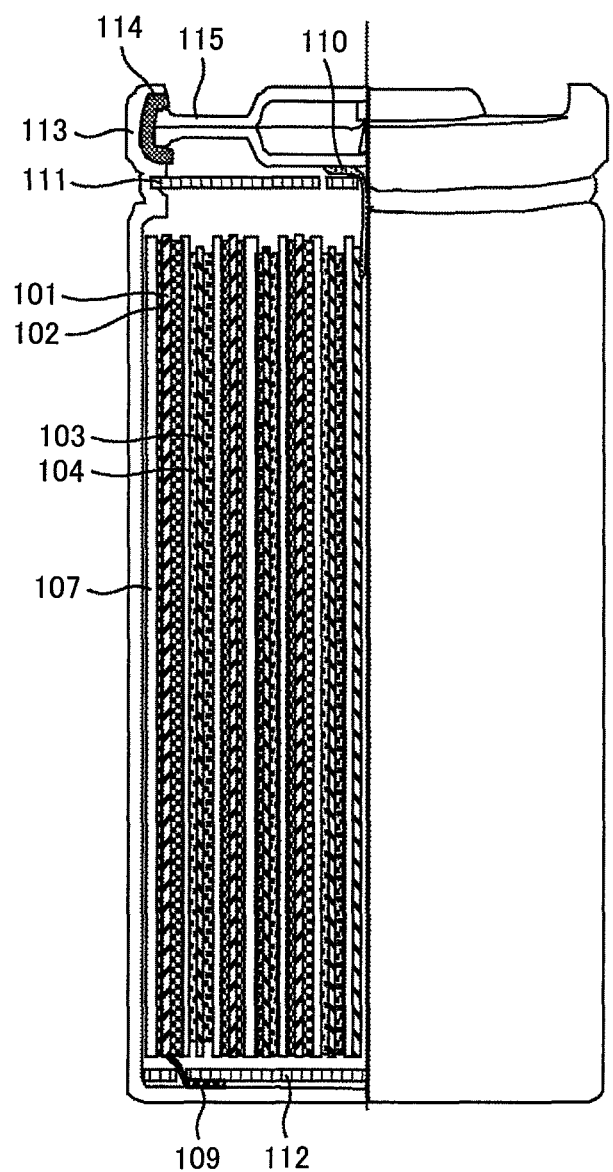
FIG. 5 is a partial sectional view illustrating a lithium secondary battery according to an embodiment of the present invention.

FIG. 5 is a half sectional view of the spirally wound lithium secondary battery.

The lithium secondary battery has a structure which is formed by laminating a positive electrode and a negative electrode with the interposition of a separator to form a multilayer electrode; spirally winding the multilayer electrode to form an electrode; placing the electrode into a battery casing; charging an electrolyte solution thereinto; and sealing the battery casing.

FIG. 5 illustrates a negative-electrode lead 109; a positive-electrode lead 110; a positive-electrode insulator 111; a negative-electrode insulator 112; a gasket 114; and a positive-electrode battery lid 115.

FIG. 5 also illustrates a positive-electrode current collector 101; a positive-electrode mixture layer 102; a negative-electrode current collector 103; a negative-electrode mixture layer 104; a separator 107; and a negative-electrode battery can 113.

The lithium secondary battery according to this embodiment can employ the following materials.

[Positive Electrode]

The positive electrode is formed by applying a positive-electrode mixture to an aluminum foil, in which the positive-electrode mixture contains a positive-electrode active material such as a lithium composite oxide; a conductive material typified by a graphite-like carbonaceous material; and a binder. The positive-electrode mixture layer preferably has a porosity of 25 to 40% by volume based on the total volume of the positive-electrode mixture layer.

If the positive-electrode mixture layer has the porosity less than 25% by volume of the total volume thereof, it may allow a less amount of the electrolyte solution to permeate thereinto and may thereby contain lithium ions in a less number. Thus, lithium ions are supplied in an insufficient amount to the positive-electrode active material especially at low temperature, resulting in insufficient power output.

In contrast, if the positive-electrode mixture layer has a porosity more than 40% by volume, it may contain the positive-electrode mixture in a smaller amount (relative amount), and this may lower the input and output.

[Negative Electrode]

The negative electrode is formed by applying a negative-electrode mixture to a copper foil, which negative-electrode mixture contains a negative-electrode active material such as amorphous carbon; a conductive material; and a binder. The negative-electrode mixture layer preferably has a porosity of 25 to 40% by volume based on the total volume of the negative-electrode mixture layer.

If the negative-electrode mixture layer has a porosity less than 25% by volume of the total volume of the negative-electrode mixture layer, it may allow a less amount of the electrolyte solution to permeate thereinto and may thereby contain lithium ions in an insufficient number. Thus, lithium ions are supplied in an insufficient amount to the negative-electrode active material especially at low temperatures, resulting in insufficient power output.

In contrast, if the negative-electrode mixture layer has a porosity more than 40% by volume, it may contain the negative-electrode mixture in a smaller relative amount, and this may lower the input and output.

[Separator]

The separator can be any separator used in customary lithium secondary batteries using a non-aqueous electrolyte solution.

Exemplary separators include microporous films made of polyolefins such as polyethylenes and polypropylenes; and nonwoven fabrics.

For higher capacity of the battery, the separator has a thickness of preferably 20 μm or less and more preferably 18 μm or less. The separator having such a thickness allows the battery to have a larger capacity per volume.

However, the separator has a thickness of preferably 10 μm or more in terms of its lower limit, because an excessively thin separator may have poor handleability or may not sufficiently separate between the positive electrode and the negative electrode to often cause a short circuit.

[Battery Casing]

The battery casing can be any one for use in known lithium secondary batteries.

Exemplary battery casings usable herein include an aluminum or stainless steel casing, where a battery lid (sealing plate) is welded through laser welding to the casing or is sealed with the casing through crimp sealing using a gasket (packing).

The positive electrode and the negative electrode are separated from the battery casing by using a glass or resinous insulator disposed in the casing.

[Electrolyte]

The electrolyte solution can be an organic-solvent-based non-aqueous electrolyte solution as a solution of a lithium salt in an organic solvent.

Exemplary organic solvents for use in the electrolyte solution include chain esters such as dimethyl carbonate, diethyl carbonate, ethyl methyl carbonate, and methyl propyl carbonate; cyclic esters having a high dielectric constant, such as ethylene carbonate, propylene carbonate, butylene carbonate, and vinylene carbonate; and solvent mixtures of a chain ester and a cyclic ester, though not being limited thereto. Among them, preferred is a solvent mixture containing a chain ester as a main solvent, the solvent mixture containing a cyclic ester added.

Exemplary lithium salts for use in the electrolyte solution include inorganic lithium salts such as $LiPF_6$, $LiBF_4$, $LiClO_4$, LiI, LiCl and LiBr; and organic lithium salts such as $LiB[OCOCF_3]_4$, $LiB[OCOCF_2CF_3]_4$, $LiPF_4(CF_3)_2$, $LiN(SO_2CF_3)_2$ and $LiN(SO_2CF_2CF_3)_2$, though not being limited thereto.

Among them, $LiPF_6$ used widely for batteries for domestic purposes is a suitable compound because of its quality stability.

Independently, $LiB[OCOCF_3]_4$ is an effective compound, because it exhibits high dissociation capability and solubility, and also high conductivity even at a low content.

[Fabrication Method of Lithium Secondary Battery]

A method for fabricating a spirally wound lithium secondary battery will be illustrated below.

Initially, particles of a lithium composite oxide as a positive-electrode active material is blended with a conductive material such as graphite, acetylene black or carbon black, further combined with a binder, kneaded, and thereby yields a positive-electrode slurry, in which the binder is a solution typically of PVDF in a solvent such as N-methyl-2-pyrrolidinone (NMP).

Next, the slurry is applied to an aluminum metallic foil, dried, and thereby yields a positive electrode.

Independently, graphite carbon or soft carbon as a negative-electrode active material is blended with a conductive material such as carbon black, acetylene black or carbon fiber. This mixture is further combined typically with a solution of PVDF in NMP, or a rubber binder SBR as a binder, kneaded, and thereby yields a negative-electrode slurry.

Next, the negative-electrode slurry is applied to a copper foil, dried, and thereby yields a negative electrode.

In the formation of the positive electrode or negative electrode, the slurry is dried after it is applied to both sides of the electrode.

The electrodes are then densified through rolling, cut to desired shapes, and thereby yield product electrodes.

Next, lead strips are formed to supply a current to these electrodes.

A separator made of a porous insulating material is interposed between the positive electrode and the negative electrode, the resulting article is spirally wound, and encased in a battery can made of stainless steel or aluminum.

Next, the lead strips are connected to the battery can, a non-aqueous electrolyte solution is charged thereinto, and, lastly, the battery can is sealed to give a lithium secondary battery.

[Battery Module]

The lithium secondary battery may be used typically as a lithium secondary battery module including two or more batteries connected in series.

The present invention will be illustrated in further detail with reference to several working examples below.

Example 1

(1) Production of Negative Electrode for Lithium Secondary Battery

A copper foil used herein as a metal substrate was a rolled copper foil having a thickness of 10 μm and containing 0.01 percent by mass of tin (Sn).

The rolled copper foil was subjected to electrolytic degreasing and acid pickling to clean the surfaces thereof.

The electrolytic degreasing was performed by treating the copper foil in an aqueous solution containing 40 g/dm$^3$ of sodium hydroxide and 20 g/dm$^3$ of sodium carbonate at a temperature of 40° C. and a current density of 5 A/dm$^2$ for 10 seconds. The acid pickling was performed by treating the copper foil with an aqueous solution containing 150 g/dm$^3$ of sulfuric acid at a temperature of 25° C. for 5 seconds.

The copper foil after these treatments was rinsed with running water.

Next, the copper foil was subjected to copper electroplating on its surfaces. A copper plating bath used herein was an aqueous solution containing 185 g/dm$^3$ of copper sulfate pentahydrate, 80 g/dm$^3$ of sulfuric acid, 60 g/dm$^3$ of pseudo-anisotropic carbon particles (having a particle size in terms of median diameter D50 of 10 μm), 10 g/dm$^3$ of SBR, and 0.01 g/dm$^3$ of gelatin.

The plating was performed at a plating bath temperature of 30° C. and a plating current density of 15 A/dm$^2$ for 20 seconds.

Next, the copper foil was rinsed with water and subjected to electroplating at a current density of 2 A/dm$^2$ for 5 seconds in a plating bath held at a temperature of 50° C. to form a nickel-plated layer in an amount of 10 μg/cm$^2$. The plating bath contained 300 g/dm$^3$ of nickel sulfate hexahydrate, 45 g/dm$^3$ of chloride nickel, and 50 g/dm$^3$ of boric acid.

Next, the copper foil was rinsed with water and subjected to electrolytic plating at a current density of 1.5 A/dm$^2$ for 4 seconds in a plating bath held at a temperature of 30° C. to form a zinc-plated layer in an amount of 1.0 μg/cm$^2$. The plating bath contained 90 g/dm$^3$ of zinc sulfate and 70 g/dm$^3$ of sodium sulfate.

The copper foil was further subjected to trivalent chromium conversion coating to form a chromate coating thereon in the amount of 1.1 μg/cm$^2$.

Next, the copper foil was rinsed with water, immersed in a silane coupling agent containing 5% 3-aminopropyltrimethoxysilane at room temperature for 5 seconds, dried at a temperature of 120° C. without delay, to form a silane coupling layer.

The resulting electrode was observed on its cross section with an electron microscope to find that the plated layer had a thickness of 1.2 μm.

The above process gave a negative electrode (a part) including the metal substrate, and the copper-plated layer arranged thereon from which surface the amorphous carbon particles (active material particles) and the binder were exposed.

(2) Fabrication of Lithium Secondary Battery

A negative electrode material paste was prepared using pseudo-anisotropic carbon as amorphous carbon serving as negative-electrode active material particles, carbon black (CB1) as a conductive material, and PVDF as a binder, to have a solids content composition of the pseudo-anisotropic carbon:CB1:PVDF of 88:5:7 by mass (dry basis).

The negative electrode material paste was applied to the negative-electrode current collector 103 prepared in Process (1), dried at 80° C., roll-pressed, dried at 120° C. to form a negative-electrode mixture layer 104 on the negative-electrode current collector 103. The negative-electrode mixture layer had a porosity set at 35 percent by volume based on the total volume of the negative-electrode mixture layer.

A positive electrode material paste was prepared using LiMn$_{1/3}$Ni$_{1/3}$CO$_{1/3}$O$_2$ as a positive-electrode active material, carbon black (CB2) and graphite (GF2) both as conductive materials, PVDF as a binder, and NMP as a solvent to have a composition ratio (by mass) in terms of solids content of LiMn$_{1/3}$Ni$_{1/3}$CO$_{1/3}$O$_2$:CB2:GF2:PVDF of 86:2:9:3 (dry basis).

The positive electrode material paste was spread over an aluminum foil working as a positive-electrode current collector 101, dried at 80° C., roll-pressed, dried at 120° C., and thereby formed a positive-electrode mixture layer 102 on the positive-electrode current collector 101. The positive-electrode mixture layer 102 had a porosity set at 30 percent by volume based on the total volume of the positive-electrode mixture layer.

A separator 107 was interposed between the electrodes prepared above, the resulting article was wound to form a spirally wound assembly, which was encased in a negative-electrode battery can 113.

An electrolyte solution was injected into the assembly, sealed by caulking a positive-electrode battery lid 115 equipped with a gasket 114 to the negative-electrode battery can 113, and thereby yielded a spirally wound battery having a diameter 18 mm and a length of 65 mm. The electrolyte solution used herein was a solution of 1.0 mole/liter LiPF$_6$ in a solvent mixture having 1:2 of the ratio of ethylene carbonate (EC) and dimethyl carbonate (DMC) by volume.

Example 2

(1) Production of Negative Electrode for Lithium Secondary Battery

A negative electrode for a lithium secondary battery was produced by the procedure of Example 1, except for using an aqueous solution containing 185 g/dm³ of copper sulfate pentahydrate, 80 g/dm³ of sulfuric acid, 60 g/dm³ of pseudo-anisotropic carbon particles (having a particle size in terms of D50 of 10 μm), 10 g/dm³ of SBR, 0.01 g/dm³ of gelatin, and 0.1 g/dm³ of carbon nanotube as the copper plating bath.

The above process gave a negative electrode including the metal substrate and the copper-plated layer arranged thereon from which surface the amorphous carbon particles, the binder and the conductive material were exposed.

(2) Fabrication of Lithium Secondary Battery

A spirally wound lithium secondary battery was fabricated by the procedure of Example 1, except for using the negative electrode produced in Process (1).

Example 3

(1) Production of Negative Electrode for Lithium Secondary Battery

A copper-electroplated layer as a first plated layer was formed on a copper foil by the procedure of Example 1, except for performing plating at a plating current density of 15 A/dm² for 15 seconds using an aqueous solution containing 185 g/dm³ of copper sulfate pentahydrate, 80 g/dm³ of sulfuric acid, 60 g/dm³ of pseudo-anisotropic carbon particles (having a particle size in terms of D50 of 10 μm), and 0.01 g/dm³ of gelatin as the plating bath.

Next, another copper-electroplated layer as a second plated layer was formed on the resulting copper foil.

A copper plating bath used herein was an aqueous solution containing 185 g/dm³ of copper sulfate pentahydrate, 80 g/dm³ of sulfuric acid, 10 g/dm³ of SBR, and 0.01 g/dm³ of gelatin.

The second plating was performed at a plating bath temperature of 30° C. and a plating current density of 5 A/dm² for 5 seconds.

An electron micrographic observation of the cross section of the electrode revealed that the first plated layer had a thickness of 0.9 μm and the second plated layer had a thickness of 0.1 μm.

The above process gave the negative electrode including the metal substrate and the copper-plated layers arranged thereon from which surface the amorphous carbon particles and the binder were exposed.

(2) Fabrication of Lithium Secondary Battery

A spirally wound lithium secondary battery was fabricated by the procedure of Example 1, except for using the negative electrode produced in Process (1).

Example 4

(1) Production of Negative Electrode for Lithium Secondary Battery

A negative electrode was produced by the procedure of Example 3, except for using an aqueous solution containing 185 g/dm³ of copper sulfate pentahydrate, 80 g/dm³ of sulfuric acid, 10 g/dm³ of SBR, 0.01 g/dm³ of gelatin, and 0.1 g/dm³ of carbon nanotube as the plating bath for the formation of the second plated layer.

An electron micrographic observation of the cross section of the electrode revealed that the first plated layer had a thickness of 0.9 μm and the second plated layer had a thickness of 0.1 μm.

The above process gave the negative electrode including the metal substrate and the copper-plated layers arranged thereon from which surface the amorphous carbon particles, the binder, and the conductive material were exposed.

(2) Fabrication of Lithium Secondary Battery

A spirally wound lithium secondary battery was fabricated by the procedure of Example 1, except for using the negative electrode produced in Process (1).

Comparative Example 1

(1) Production of Negative Electrode for Lithium Secondary Battery

A negative electrode was produced by the procedure of Example 1, except for using an aqueous solution containing 185 g/dm³ of copper sulfate pentahydrate and 80 g/dm³ of sulfuric acid as the copper plating bath.

(2) Fabrication of Lithium Secondary Battery

A spirally wound lithium secondary battery was fabricated by the procedure of Example 1, except for using the negative electrode produced in Process (1).

Comparative Example 2

(1) Production of Negative Electrode for Lithium Secondary Battery

A negative electrode was produced by the procedure of Example 1, except for using an aqueous solution containing 185 g/dm³ of copper sulfate pentahydrate, 80 g/dm³ of sulfuric acid, 60 g/dm³ of pseudo-anisotropic carbon particles (having a particle size in terms of D50 of 10 μm), and 0.01 g/dm³ of gelatin as the copper plating bath.

(2) Fabrication of Lithium Secondary Battery

A spirally wound lithium secondary battery was fabricated by the procedure of Example 1, except for using the negative electrode produced in Process (1).

Comparative Example 3

(1) Production of Negative Electrode for Lithium Secondary Battery

A negative electrode was produced by the procedure of Example 1, except for using an aqueous solution containing 185 g/dm³ of copper sulfate pentahydrate, 80 g/dm³ of sulfuric acid, 10 g/dm³ of SBR, and 0.01 g/dm³ of gelatin as the copper plating bath.

(2) Fabrication of Lithium Secondary Battery

A spirally wound lithium secondary battery was fabricated by the procedure of Example 1, except for using the negative electrode produced in Process (1).

[Evaluation Methods]

(Evaluation for Adhesion between Mixture Layer and Current Collector)

One hundred plies of the electrode including the mixture layer and the current collector and having a diameter of 15 mm were immersed in the electrolyte solution held at 50° C.

for one week, retrieved from the electrolyte solution, the percentage of samples which did not undergo delamination of the mixture layer from the current collector was determined, and the adhesion between the mixture layer and the current collector was evaluated based on the percentage.

The relative adhesions of the samples according to the examples and comparative examples are shown in Table 1, while setting the adhesion of the sample according to Comparative Example 1 to be 100.

(Evaluation of Battery)

How the direct current resistance (DCR) and the discharging capacity of the spirally wound battery as illustrated in FIG. 5 change at 25° C. was evaluated.

The changes of the DCR and discharging capacity were evaluated as percentages of change before and after storage of the spirally wound battery in a thermostatic chamber set at 50° C. for 30 days.

Initially, the spirally wound battery was charged at a constant current corresponding to 0.3 C and a constant voltage to an upper limit voltage of 4.2 V for 5 hours, and repeatedly charged and discharged to a lower limit voltage of 2.7 V three times to initialize the battery.

The discharging capacity of the battery was measured by charging the battery at 0.3 C to an upper limit voltage of 4.2 V and then discharging the battery to a lower limit voltage of 2.7 V.

The direct current resistance of the battery was determined based on the slope of a plot as plotted between the discharging current (I) and the voltage drop ($\Delta V$) of the battery.

The battery was discharged at different discharging currents corresponding to 1 C, 3 C and 6 C, respectively, and voltage drops after 10-second discharging at the different discharging currents (I) were measured. Specifically, the battery was charged at a constant current corresponding to 0.3 C and a constant voltage to an upper limit voltage of 4.2 V for 5 hours and then discharged at a constant current of any of the different discharging currents to a lower limit voltage of 2.7 V. An open-circuit voltage before the discharging and a voltage after 10-second discharging were respectively measured, and the difference between them was determined as the voltage drop ($\Delta V$).

The determined or evaluated adhesion, capacity maintenance percentage, and percentage of DCR rise of the respective examples and comparative examples are shown in Table 1.

mixture layer and the current collector; and that the presence of the active material and the binder in the surface of the current collector protects the battery from having a reduced capacity and allows the battery to have satisfactory storage stability at high temperature.

Table 1 also demonstrates that the presence of the conductive material, in addition to the active material and the binder, exposed from the surface of the current collector further protects the battery from rise of DCR and from decrease in output.

The lithium secondary batteries according to the embodiments do not suffer from deterioration in capacity and output characteristics during long-term storage at high temperature, as compared to known lithium secondary batteries.

The lithium secondary batteries according to the embodiments are widely usable as power sources such as back-up power sources for electrically driven control systems for vehicles. In addition, they are also suitable as power sources for industrial machines such as electrically driven tools and forklifts.

The lithium secondary batteries according to the embodiments show higher adhesion between the electrode mixture layer and the current collector and thereby are resistant to deterioration or reduction in lifetime and output properties.

INDUSTRIAL APPLICABILITY

The lithium secondary batteries according to the present invention are widely usable typically as power sources for hybrid electric vehicles.

What is claimed is:

1. An electrode for a lithium secondary battery, the electrode comprising:
   a current collector for a lithium secondary battery that is a metal substrate;
   a plated layer arranged on a surface of the current collector; and
   wherein active material particles capable of inserting and extracting lithium ions and resin particles adhesive with the active material particles are embedded in the plated layer,
   wherein a part of the active material particles and the resin particles has a protruding portion extending away from the current collector beyond the plated layer.

TABLE 1

| Sample | First plated layer | | | Second plated layer | | | Adhesion % | Capacity maintenance percentage % | Percentage of DCR rise % |
|---|---|---|---|---|---|---|---|---|---|
| | Active material | Binder | Conductive material | Active material | Binder | Conductive material | | | |
| Example 1 | present | present | absent | — | — | — | 454 | 88 | 21 |
| Example 2 | present | present | present | — | — | — | 413 | 83 | 15 |
| Example 3 | present | absent | absent | absent | present | absent | 468 | 91 | 23 |
| Example 4 | present | absent | absent | absent | present | present | 423 | 85 | 18 |
| Comparative Example 1 | absent | absent | absent | — | — | — | 100 | 51 | 43 |
| Comparative Example 2 | present | absent | absent | — | — | — | 163 | 62 | 38 |
| Comparative Example 3 | absent | present | absent | — | — | — | 216 | 68 | 40 |

Table 1 demonstrates that the presence of the active material and the binder exposed from the surface of the current collector (present at an interface between the current collector and the mixture layer) increases the adhesion between the 2. The electrode according to claim 1,
   wherein a conductive material is further embedded in the plated layer.

3. An electrode for a lithium secondary battery, the electrode comprising:
a current collector for a lithium secondary battery that is a metal substrate; and
a plated layer arranged on a surface of the current collector,
wherein active material particles capable of inserting and extracting lithium ions and resin particles adhesive with the active material particles are embedded in the plated layer,
wherein a part of the active material particles and the resin particles has a protruding portion extending away from the current collector beyond the plated layer,
wherein the plated layer is composed of a first plated layer and a second plated layer, the first plated layer being arranged between the current collector and the second plated layer and bearing the active material particles as embedded therein, and the second plated layer being arranged on the first plated layer and bearing the resin particles as embedded therein, and
wherein a part of the active material particles and the resin particles have the protruding portion beyond the second plated layer.

4. The electrode according to claim 3,
wherein a conductive material is further embedded in the second plated layer.

5. The electrode according to claim 3,
wherein the first plated layer has a thickness larger than that of the second plated layer.

6. A lithium secondary battery comprising:
a positive electrode capable of inserting and extracting lithium ions;
a negative electrode capable of inserting and extracting lithium ions;
a separator interposed between the positive electrode and the negative electrode; and
an electrolyte solution,
wherein at least one of the positive electrode and the negative electrode is the electrode according to claim 1.

7. An electrode for a lithium secondary battery, the electrode comprising:
a current collector for a lithium secondary battery that is a metal substrate; and
a plated layer arranged on a surface of the current collector,
wherein active material particles capable of inserting and extracting lithium ions and resin particles adhesive with the active material particles are embedded in the plated layer,
wherein a part of the active material particles and the resin particles has a protruding portion extend iii away from the current collector beyond the plated layer,
wherein the plated layer further comprises a metal forming the plated layer, and
wherein the plated layer is essentially without voids between the metal forming the plated layer and each of the active material particles and the resin particles embedded in the plated layer.

8. The electrode according to claim 7,
further comprising a mixture layer applied to a surface of the plated layer as a coating of an electrode material containing the active material particles.

9. The electrode according to claim 7,
wherein a conductive material is further embedded in the plated layer.

10. The electrode according to claim 7,
wherein the plated layer is composed of a first plated layer and a second plated layer, the first plated layer being arranged between the current collector and the second plated layer and bearing the active material particles as embedded therein, and the second plated layer being arranged on the first plated layer and bearing the resin particles as embedded therein, and
wherein a part of the active material particles and the resin particles have the protruding portion beyond the second plated layer.

11. The electrode according to claim 10,
wherein a conductive material is further embedded in the second plated layer.

12. The electrode according to claim 10,
wherein the first plated layer has a thickness larger than that of the second plated layer.

13. The electrode according to claim 7, wherein the plated layer is formed by subjecting the current collector to dispersion plating.

14. The electrode according to claim 1, wherein the plated layer is arranged directly on the surface of the current collector.

15. The electrode according to claim 14,
further comprising a mixture layer applied to a surface of the plated layer as a coating of an electrode material containing the active material particles.

16. The electrode according to claim 14,
wherein a conductive material is further embedded in the plated layer.

17. The electrode according to claim 14,
wherein the plated layer is composed of a first plated layer and a second plated layer, the first plated layer being arranged between the current collector and the second plated layer and bearing the active material particles as embedded therein, and the second plated layer being arranged on the first plated layer and bearing the resin particles as embedded therein, and
wherein a part of the active material particles and the resin particles have the protruding portion beyond the second plated layer.

18. The electrode according to claim 17,
wherein a conductive material is further embedded in the second plated layer.

19. The electrode according to claim 17,
wherein the first plated layer has a thickness larger than that of the second plated layer.

* * * * *